Oct. 15, 1968  H. SINCLAIR  3,405,572

POWER TRANSMISSION SYSTEM

Filed June 8, 1966  2 Sheets-Sheet 2

United States Patent Office 3,405,572
Patented Oct. 15, 1968

3,405,572
POWER TRANSMISSION SYSTEM
Harold Sinclair, Kensington, London, England, assignor to S.S.S. Patents Limited, Acton Town, London, England
Filed June 8, 1966, Ser. No. 556,047
Claims priority, application Great Britain, June 11, 1965, 24,868/65; July 5, 1965, 28,403/65; Aug. 10, 1965, 34,226/65
9 Claims. (Cl. 74—675)

ABSTRACT OF THE DISCLOSURE

In a power transmission system wherein a main driving machine is coupled to the input member of epicyclic gearing and a driven machine is coupled to the output member of the gearing, a reversible electric motor which is preferably a multi-speed induction motor is provided for driving the reaction member of the gearing to give a range of closely spaced speeds of the driven machine, including the normal rotational speed obtained when the reaction member is held stationary by a friction brake. In order to provide for off-load starting of the driving machine and for smooth take-up of the drive of the driven machine, a hydrodynamic brake of controllable type is coupled to the reaction member. The presence of the controllable hydrodynamic brake further enables a range of speeds of the driven machine to be obtained which is below the above-mentioned range of closely spaced speeds, and further enables a braking torque to be exerted on the reaction member sufficient to bring the driven machine to a speed such that it is practicable to switch on the electric motor to give the lowest of the said closely spaced speeds of the driven machine.

In order to avoid overspeeding of the electric motor in reverse rotation during starting of the system, an overrunning clutch is provided between the electric motor and the reaction member, in an arrangement such that the clutch tends to disengage when the main driving machine is rotating with the hydrodynamic brake released and the reaction member is rotating backwards. The clutch includes control means for locking it in the engaged condition to enable the electric motor to drive the reaction member in the forward direction to increase the speed of the driven machine, and a control is provided for unlocking the clutch to prevent over speeding of the electric motor in reverse rotation if it becomes deenergized while the clutch is locked in engagement.

---

This invention relates to power transmission systems of the type comprising epicyclic gearing having an input member drivably coupled to main driving means, an output member drivably coupled to a driven machine, and a reaction member which can be held stationary to give a rotational speed of the driven machine referred to herein as the normal rotational speed, and can be rotated in the appropriate direction to increase or reduce the speed of the driven machine.

In such systems where high power and high inertia and/or high speed of the machinery are involved, acceleration of the driving and driven machines from rest presents difficulties. An object of the invention is to provide reduced load starting conditions for the driving machine; another object is to provide a plurality of closely spaced speed ratios of the transmission system with high overall efficiency, particularly suitable for driven machines having a centrifugal characteristic such as mechanical draft fans, boiler feed pumps, circulating water pumps and gas circulators associated with large electric power generating stations.

In the accompanying drawings.

Figure 1:
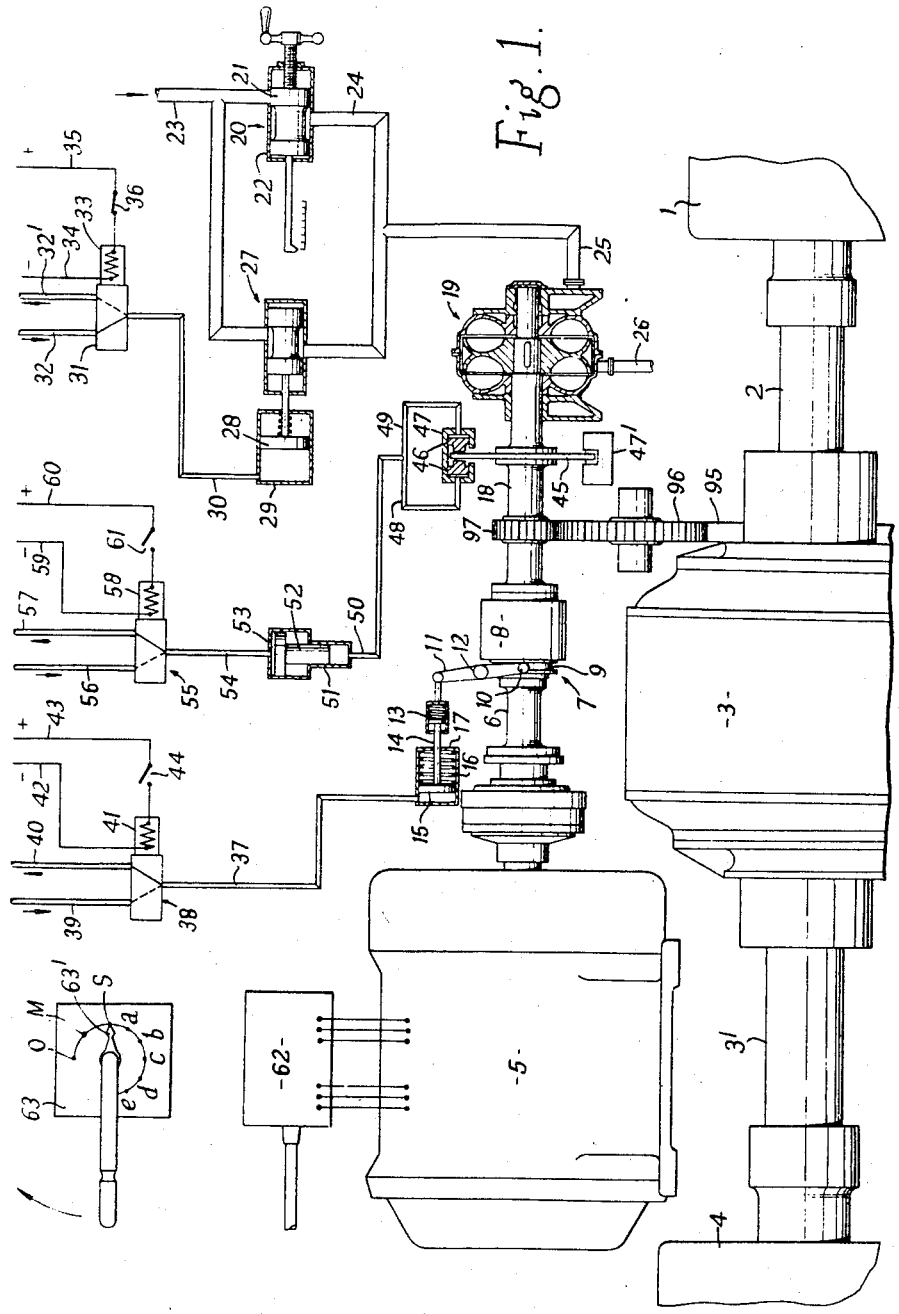
FIG. 1 is a general, partly diagrammatic view of an example of a power transmission system incorporating the invention.

Referring to FIG. 1, the driven machine is a high speed boiler feed pump 1, which is coupled to the output shaft 2, that is driven by the sun pinion of planetary gearing 3. The main driving machine is an electric motor 4 coupled to the input shaft 3' driving the annulus gear and a two-speed reversible A.C. induction motor 5 is drivably coupled to the input shaft 6 of an overrunning clutch 7 of the synchronous self-shifting type (shown in more detail in FIG. 2), the clutch being mounted on a shaft 18 which is connected through gearwheels 97, 96, 95, to the planet carrier of the epicyclic gearing 3.

The clutch 7 is in an inverted arrangement, such that for the direction of rotation of the secondary motor 5 which increases the speed of the driven machine 1 above its normal rotational speed the clutch 7 tends to disengage, if engaged; which rotation will hereinafter be referred to as forward rotation of the motor 5. Conversely upon rotation of the motor 5 in the opposite direction, hereinafter referred to as reverse rotation, relative to the shaft 18 the clutch 7 tends to engage, if disengaged, and to remain engaged if already engaged.

The clutch 7 is provided with a locking control sleeve 8 with a part 82 having a groove 9 therein engaged by a control fork 10 at one end of a lever 11, which is pivotally mounted at 12 and the other end of which is connected via a spring link 13 to a piston rod 14 of a piston movable in a hydraulic cylinder 16 containing a helical return spring 17. The shaft 18 on which the clutch 7 is mounted is drivably connected to the rotor shaft of a hydrodynamic brake 19 of the twin rotor type having inclined vanes to develop a high torque when filled with water and rotated in the aforementioned reverse direction of the motor; the casing of which brake is non-rotatably mounted.

The degree of filling of the hydrodynamic brake is controllable by means of a manually operable piston valve 20, comprising a grooved piston 21 in a cylinder 22, which controls communication between a pipe 23 leading from a water supply source under pressure, and a pipe 24 leading to a filling pipe 25 connected to a filling port in the casing of the hydrodynamic brake 19; the said casing also having a port to which is connected an emptying pipe 26. The degree of filling of the hydrodynamic brake 19 is also controllable by a remotely operable piston valve 27 actuated by a spring-returned piston 28 in a hydraulic servo cylinder 29, which is actuated by oil under pressure supplied through a pipe 30 leading to a two-way valve 31 operable to connect the pipe 30 alternatively to the said oil supply via a pipe 32 or to exhaust via a pipe 32'. The valve 31 is under the control of a solenoid 33 which is connected via leads 34 and 35 to an electrical circuit, connected through the customary "no-volt" relay switch in a circuit breaker group 62 such that the supply circuit to the solenoid 33 is automatically interrupted when the "no-volt" relay is open. The lead 35 includes an on-off switch 36 located within the manually operable selecting switch 63 which controls the reversible two-speed motor 5.

The cylinder 16 is connected by a pipe 37 to a two-way valve 38 operable to connect the pipe 37 alternatively to a pressure oil supply pipe 39 and to a pipe 40 leading to exhaust. The valve 38 is under the control of a solenoid 41 connected to the above-mentioned electrical circuit via leads 42 and 43, the lead 43 including an on-off switch 44 located within the selecting switch 63.

On the shaft 18 of the clutch 7, there is mounted a disc brake, comprising a disc 45 on the shaft 18 and piston actuated friction pads 46 accommodated in a hydraulic caliper unit 47 (a similar caliper unit being indicated at 47'), connected by pipes 48 and 49 to a pipe 50 leading from the high pressure oil supply end of a pressure intensifier 51 comprising a differential piston 52 in a cylinder 53. The low pressure input end of the pressure intensifier is connected by a pipe 54 to a two-way hydraulic valve 55 operable to connect the pipe 54 alternatively to a pipe 56 leading from an oil pressure supply, and a pipe 57 leading to exhaust. The valve 55 is under the control of a solenoid 58 connected to the above-mentioned "no-volt" relay circuit via leads 59 and 60, the lead 60 including a switch 61, located within the speed selecting switch 63.

The two-speed motor 5 is connected selectively via the circuit breaker group 62 to the speed-selecting switch 63 by operation of which a set of movable contacts indicated by the pointer 63' can be set selectively to an "off" position O, to a manual speed control position M, and to a "start" position S or to any one of the five fixed speed running positions, a, b, c, d and e corresponding to the selective operation of the solenoid valves 31, 38, 55, and to the five different speeds of the driven machine 1, as will be described.

Figure 2:
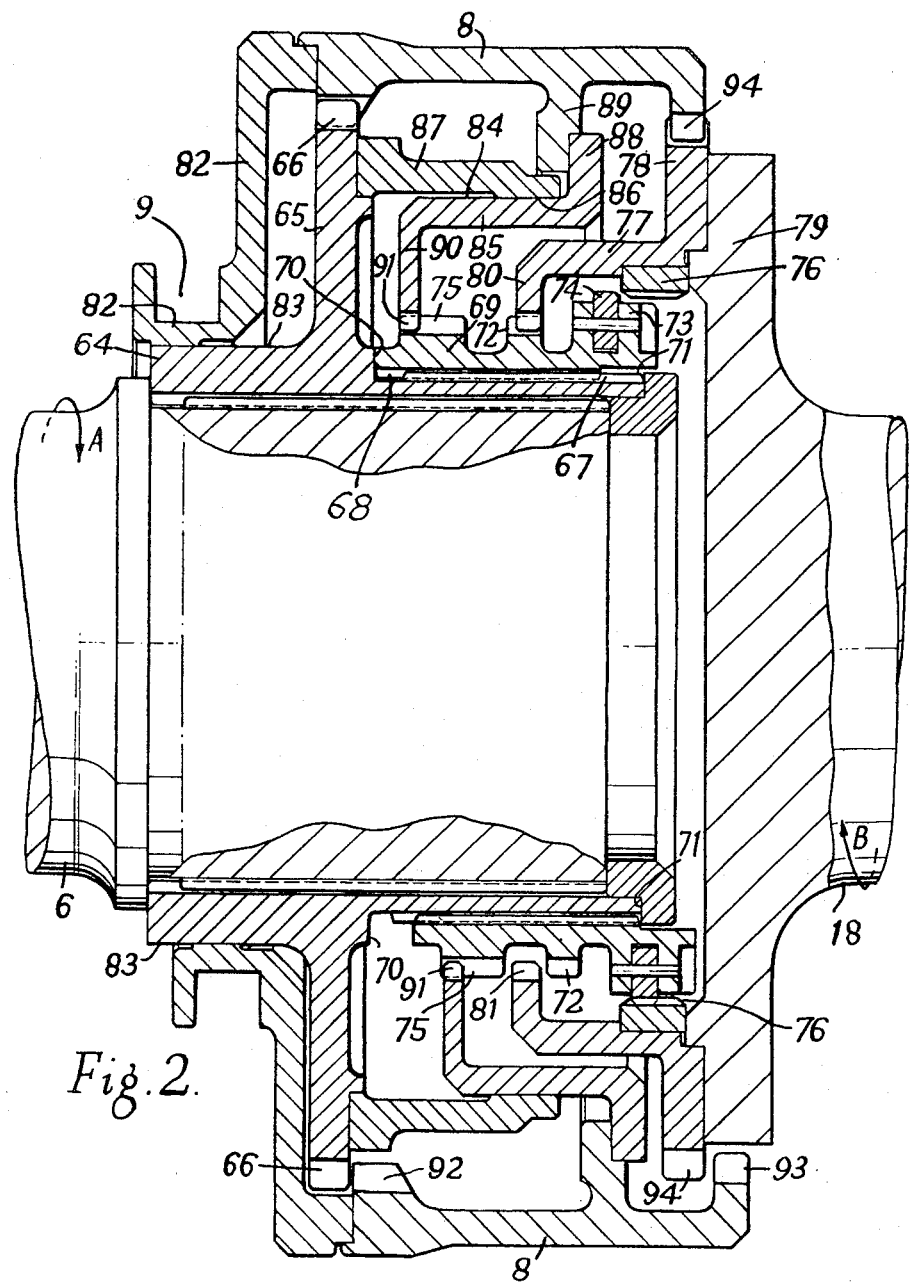
FIG. 2 is a view in longitudinal section of a synchronous self-shifting clutch employed in the power transmission system shown in FIG. 1, the clutch being shown engaged in the upper half of the figure and disengaged in the lower half.

Referring to FIG. 2, the synchronous self-shifting clutch indicated at 7 in FIG. 1, includes a sleeve 64 splined to the input shaft 6 for rotation therewith, and formed with a radially outwardly projecting annular flange 65 the periphery of which is formed with clutch locking teeth 66. The sleeve 64 is also formed with external left-hand helical splines 67 with which engage internal helical splines 68 in an intermediate member or clutch sleeve 69, which is thereby constrained for helical movement relative to the sleeve 64 and input shaft 6 between stops 70 and 71. The clutch sleeve 69 is formed with a ring of external clutch teeth 72, a radially outwardly projecting annular flange 73 formed with a groove in which pawls 74 are accommodated, and a ring of external straight splines 75. The pawls 74 are adapted to co-operate with a ring of internal ratchet teeth 76 carried by a cylindrical member 77 which has a radially outwardly projecting annular flange 78 bolted to a flange 79 on the shaft 18, and a radially inwardly projecting annular flange 80 formed with a ring of internal clutch teeth 81. The control sleeve 8 is guided for axial movement by the sliding contact of a part 82, fixed to the control sleeve 8 and formed with the groove 9, with the external surface of the sleeve 64, and by the sliding contact of a radially outer surface 84 of a cylindrical member 85 with a radially inner surface 86 of a substantially cylindrical guide 87 fixed to the flange 65. The member 85 is formed with a radially outwardly projecting flange 88 fixed to an internal ring 89 in the control sleeve 8, and with a radially inwardly projecting annular flange 90 formed with a ring of internal phasing teeth 91 engaged with the straight splines 75.

The control sleeve 8 is formed with a ring of internal locking teeth 92 adapted for co-operation with the teeth 66, and with a ring of internal locking teeth 93 adapted for co-operation with a ring of external teeth 94 formed on the flange 78, carried by flange 79 on the shaft 18. The pawls 74 are arranged so that viewing the clutch from the left-hand end in FIG. 2 the noses of the pawls point in the anti-clockwise direction.

With the locking sleeve 8 in its right-hand, viz. unlocking position shown in the lower half of FIG. 2, rotation of the shaft 6 in the forward direction indicated by the arrow A relative to the shaft 18, will cause the clutch sleeve 69 to assume the position shown in the lower half of FIG. 2 in which it is against the stop 71 and the pawls 74 ratchet past the ratchet teeth 76. Hence no driving torque is transmitted from the input shaft 6 to the shaft 18. Likewise rotation of the shaft 18 in the direction of arrow B relative to the shaft 6 will cause ratcheting of the pawls 74 relative to the ratchet teeth 76. With the clutch in the ratcheting or freewheeling condition the control sleeve 8, with the locking teeth 92, is phased angularly relative to the co-acting teeth 66 on the sleeve 64 that is splined to the shaft 6, such that axial movement of the sleeve 8 to engage the locking teeth 93, 94, and 66, 92, is prevented by end-on butting contact of the rings of locking teeth 66 and 92.

If now the shaft 6 rotates in the direction opposite to arrow A relative to shaft 18, or the shaft 18 rotates in the direction opposite to arrow B relative to shaft 6, pawls 74 engage ratchet teeth 76 and the clutch sleeve 69 is shifted helically (to the left in FIG. 2) to bring about initial interengagement of the clutch teeth 72 and 81. The interaction of these clutch teeth causes the clutch sleeve 69 to continue on its helical movement until it is against the stop 70 and the clutch teeth 72 and 81 are fully engaged, as shown in the upper half of FIG. 2. During the helical movement of the clutch sleeve 69 the straight splines 75 cooperate with the phasing teeth 91 to turn the control sleeve 8 into an angular position, relative to sleeve 64, such that it is correctly phased for axial movement into the locking position, viz. the locking teeth 93 are rotating at the same speed and are phased precisely opposite the intertooth gaps of the teeth 94 carried by the shaft 18; also the locking teeth 92 are positioned precisely opposite the intertooth gaps of the teeth 66 carried by the shaft 6. The control sleeve 8 can now be shifted to the left from the unlocking position shown in the lower half of FIG. 2 to the locking position shown in the upper half of FIG. 2 to lock the clutch and to connect the shafts 6 and 18 for rotation together; the shifting of the control sleeve 8 being effected by the fork 10, FIG. 1, under the control of the valve 38.

When the system is to be started, the selector pointer 63' is placed on stud S. In this position the motor 5 is de-energised and is stationary. The switch 44 is open so that the solenoid 41 is de-energised and the valve 38 connects the pipe 37 to exhaust pipe 40. Hence there is no hydraulic pressure applied to the piston 15, which is in the left-hand position shown in FIG. 1 under the action of the spring 16, and the control sleeve 8 is in its right-hand unlocking position (lower half of FIG. 2). The switch 61 is open, so that the valve 55 connects the pipe 54 to exhaust and the disc brake 45–47 is off. The switch 36 is closed, so that the solenoid 33 is energised and the valve 31 connects the pipe 32 to the pressure oil supply, so that hydraulic pressure is applied to the piston 28, and the valve 27 connects the water supply pipe 23 to the pipe 25 and the hydrodynamic brake 19 begins to fill. The manually operated valve 20 may be closed, or partly or fully open to connect the pipes 23 and 25 and thereby assist the filling of the hydrodynamic brake. The main motor 4 is energised, and runs up to speed, the reaction of the gearing 3 causing the shaft 18 to be rotated in the reverse direction at high speed together with the rotor of the initially empty hydrodynamic brake 19 and the disc 45 of the disc brake; the clutch 7 overrunning so that the high speed rotation of the shaft 18 is not imparted to the motor 5. As the hydrodynamic brake 19 fills it exerts an increasingly powerful retarding action on the shaft 18, and hence on the reaction member of the epicyclic gear 3, causing the feed pump to accelerate up to say 95% of its nominal speed.

Following starting of the system, five fixed running speeds of the feed pump 1 are obtained as follows:

(1) Selector pointer 63' placed on stud a. The effects are that the motor 5 is switched on for high speed rotation in the reverse direction; switch 44 is closed, so that solenoid 41 actuates valve 38 to connect pipe 37 to pressure oil supply pipe 39, thereby applying hydraulic pressure to the piston 15, which via the spring link 13 urges the lever 11 in the direction to move the control sleeve 8 of the synchronous clutch 7 to the left, the sleeve only moving so far as to bring its locking teeth 92 and 66 into end-on butting engagement; switch 61 remains open, so that the disc brake 45–47 remains inoperative; switch 36 is opened, so that the solenoid 33 is de-energised and the valve 31 connects the pipe 30 to the exhaust pipe 32′, and the piston 28 moves to the left under the action of its spring, thereby closing valve 27. Manually operated valve 20 is closed, if hitherto open or partly open. Hence, the hydrodynamic brake 19 ceases to be supplied with water, and the brake empties via the drain pipe 26, thereby progressively reducing its torque reaction and permitting the reverse rotating shaft 18 to be accelerated in the same rotational sense. As soon as synchronism is reached between the shafts 6 and 18 the clutch 7 engages, whereupon the control sleeve 8 moves to the left and locks the clutch in engagement. The combined effect of the driving of the input shaft of the epicyclic gearing by the main motor 4 and the rotation of the reaction member of the epicyclic gearing by the motor 5 via the clutch 7, shaft 18 and gearing 95, 96, 97 is to cause the feed pump 1 to be driven at 94% of its normal rotational speed; the motor 5 operating regeneratively to return to the power line energy derived from the rotation of the reaction member of the gear 3.

(2) Selector pointer 63′ placed on stud *b*. The effect is that the motor 5 is switched to low speed reverse rotation; switch 44 remains closed, switch 61 remains open; switch 36 remains open. The feed pump 1 is driven at 97% of its normal rotational speed.

(3) Selector pointer 63′ placed on stud *c*. This has the effect that the motor 5 is de-energised; switch 61 is closed so that the solenoid 58 actuates valve 55 to admit pressure oil by supply pipe 54 to the pressure intensifier 51, whereby high pressure oil is applied to the disc brake 45–47 to stop the shaft 18; switch 44 remains closed; switch 36 remains open. The feed pump runs at its normal rotational speed.

(4) The selector pointer 63′ placed on stud *d*. This has the effects that the motor 5 is switched for low speed forward running, now operating as a motor to drive the shaft 18 in forward rotation, and drive the reaction member of the gear 3 in the sense to increase the speed of the feed pump 1; switch 44 remains closed so that the clutch 7 remains locked in engagement; switch 61 is opened so that the disc brake 45–47 is released; switch 36 remains open so that the hydrodynamic brake 19 remains empty. The feed pump is driven at 103% of its normal rotational speed.

(5) Selector pointer 63′ placed on stud *e*. This switches the motor 5 to high speed forward rotation, operating as a motor driving the reaction member of the gear 3; switch 44 remains closed so that clutch 7 remains locked in engagement; switch 61 remains open so that the disc brake 45–47 remains released; switch 36 remains open so that the hydrodynamic brake 19 remains empty. The feed pump 1 is driven at 106% of its normal rotational speed.

The converse sequence of operations of the selector switch 63 is carried out to reduce the speed of the feed pump in progressive steps.

When it is desired to operate the pump 1 at variable speed over a speed range below 94% of its normal rotational speed, the selector pointer 63′ is moved to position "M," in which the main motor is running, with the motor 5 switched off and stationary, and with the switches 44, 61 and 36 open. The degree of filling of the hydrodynamic brake 19 is then regulated manually by the control valve 20, whereby to effect control of the torque of brake 19 and consequently the speed of rotation of the reaction member in the gear 3—to give the required lower speed of rotation of the pump 1.

In the event of interruption in an electrical circuit supplying or controlling the supply to the motor 5 when this is running under any of the above conditions 1, 2, 4 or 5, the effects are to operate the "no-volt" relay in the circuit breaker group 62 and to de-energise the motor 5 which rotates freely; to open the switch 44 so that the valve 38 is operated to connect the servo cylinder to exhaust and enable spring 17 to move piston 15 to the left and, via the spring link 13 and lever 11, shift the control sleeve 8 to the right to unlock the clutch 7, which disengages; to keep switch 61 open so that the disc brake 45 is released if it is applied, or remains released; and to close switch 36 so that the hydrodynamic brake 19 fills. The feed pump slows down, then stabilising at 95% of its normal rotational speed in consequence of the torque reaction applied via countershaft 18 and gearing 97, 96, 95 to the reaction member of the gear 3.

In the event of failure of oil pressure supply to the servo cylinder 17, whilst the motor 5 is running, the effects are that the clutch 7 is unlocked and disengaged, the disc brake 45 remains released, and the hydrodynamic brake 19 remains empty; the main motor 4 and the secondary motor 5 are de-energised by a switch normally closed by oil pressure and opening automatically upon failure of the oil pressure. The driven machinery comes to a standstill together with the feed pump 1.

In order to restart the system after restoration of the electrical or oil pressure supply, the selector pointer 63′ is returned to stud S, the main motor 4 being thereby restarted and the hydrodynamic brake is filled bringing the feed pump 1 up to 95% speed as previously described.

In the above described embodiment of the invention, five closely spaced efficient running speeds of the driven machine 1 are obtainable—ranging from 94% to 106%—using a single two-speed reversible motor 5.

As an alternative, there may be used two single-speed reversible motors arranged in tandem which can be coupled via shaft 18 to the reaction member of the epicyclic gearing via the inverted synchronous self-shifting clutch 7 with control lock.

Furthermore, by using 2 two-speed reversible motors adapted to be selectively coupled to the shaft 18 and thence to the reaction member each via an inverted synchronous self-shifting clutch with control lock, nine efficient speeds of the driven machine are obtainable.

In another embodiment of the invention wherein the driven machine is a condenser circulating water pump operating at say 150 r.p.m. normal rotational speed, the main motor is drivably connected to the sun pinion, the planet carrier is drivably connected to the pump, and the annulus gear which constitutes the reaction member is geared to the output shaft of the inverted synchronous self-shifting clutch.

In a further embodiment of the invention the main motor is drivably coupled to the annulus gear, the planet carrier is drivably connected to the driven machine and the sun gear constitutes the reaction member.

I claim:

1. A power transmission system comprising epicyclic gearing that includes an input member, an output member and a reaction member, the system further including main driving means drivably coupled to said input member, a driven machine drivably coupled to said output member, means operable to hold said reaction member to provide a normal rotational speed of said driven machine under the action of said main driving means, and at least one electric motor operable, with said holding means released, to rotate said reaction member whereby to provide at least one speed of said driven machine different from said normal speed, said normal speed and said one speed constituting a closely spaced range of operating speeds of said driven machine, the improvement including the feature that there is drivably coupled to said reaction member a hydrodynamic brake which is controllable as to its braking action on said reaction member to provide, with said holding means released and said electric motor inoperative, a desired range of speeds of said driven machine below said first-mentioned range of speeds.

2. A power transmission system according to claim 1 wherein said hydrodynamic brake is capable of exerting on said reaction member a braking torque sufficiently high to bring the speed of said driven machine to a value such that it is practicable to switch said electric motor into operation to establish the lowest of said closely spaced operating speeds of said driven machine.

3. A power transmission system according to claim 1 wherein said electric motor is a multi-speed reversible electric induction motor.

4. A power transmission system according to claim 1 including, between said electric motor and said reaction member, an overrunning clutch in an arrangement such that if engaged it will tend to disengage when said electric motor rotates said reaction member in the direction to increase the speed of said driven machine.

5. A power transmission system according to claim 4 wherein said clutch is a synchronous self-shifting clutch with control means operable to lock the clutch bidirectionally when engaged.

6. A power transmission system according to claim 5 including means responsive to the de-energization of said electric motor to operate said control means to unlock said clutch if locked at the time of the de-energization of said electric motor.

7. A power transmission system according to claim 6 including a fluid pressure actuated servo motor operable when supplied with fluid pressure to urge control means to clutch locking position and when relieved of fluid pressure to urge said control means to a position in which said clutch is unlocked, said means responsive to the de-energization of said electric motor including a solenoid controlled valve arranged for selectively connecting said servo motor to a source of fluid pressure or to exhaust and for connecting said servo motor to exhaust if connected to said source of fluid pressure at the time of the de-energization of said electric motor.

8. A power transmission system according to claim 1 including means responsive to the de-energization of said electric motor to effect the release of said reaction member holding means if operative to hold said reaction member at the time of the de-energization of said electric motor.

9. A power transmission system according to claim 8 wherein said reaction member holding means are constituted by a fluid pressure actuated brake arranged to be applied to hold said reaction member by the supply of fluid pressure thereto and to be released upon the relief of fluid pressure therefrom, said means responsive to the de-energization of said electric motor including a solenoid controlled valve arranged for selectively controlling the supply of fluid pressure to or its relief from said brake.

References Cited

UNITED STATES PATENTS

| | | | |
|---|---|---|---|
| 1,270,028 | 6/1918 | Henderson | 74—675 X |
| 2,422,343 | 6/1947 | Duer | 74—675 |
| 2,926,550 | 3/1960 | Stoeckicht | 74—675 |
| 3,051,267 | 8/1962 | Borden | 74—675 XR |
| 3,311,200 | 3/1967 | Hayward | 180—90 |
| 2,891,423 | 6/1959 | Connell et al. | 74—786 |

FRED C. MATTERN, JR., *Primary Examiner.*

ARTHUR T. McKEON, *Assistant Examiner.*